Feb. 19, 1963 L. A. LYSTAD 3,077,628
WINDOW CLEANING MECHANISM
Filed July 31, 1961 3 Sheets-Sheet 3

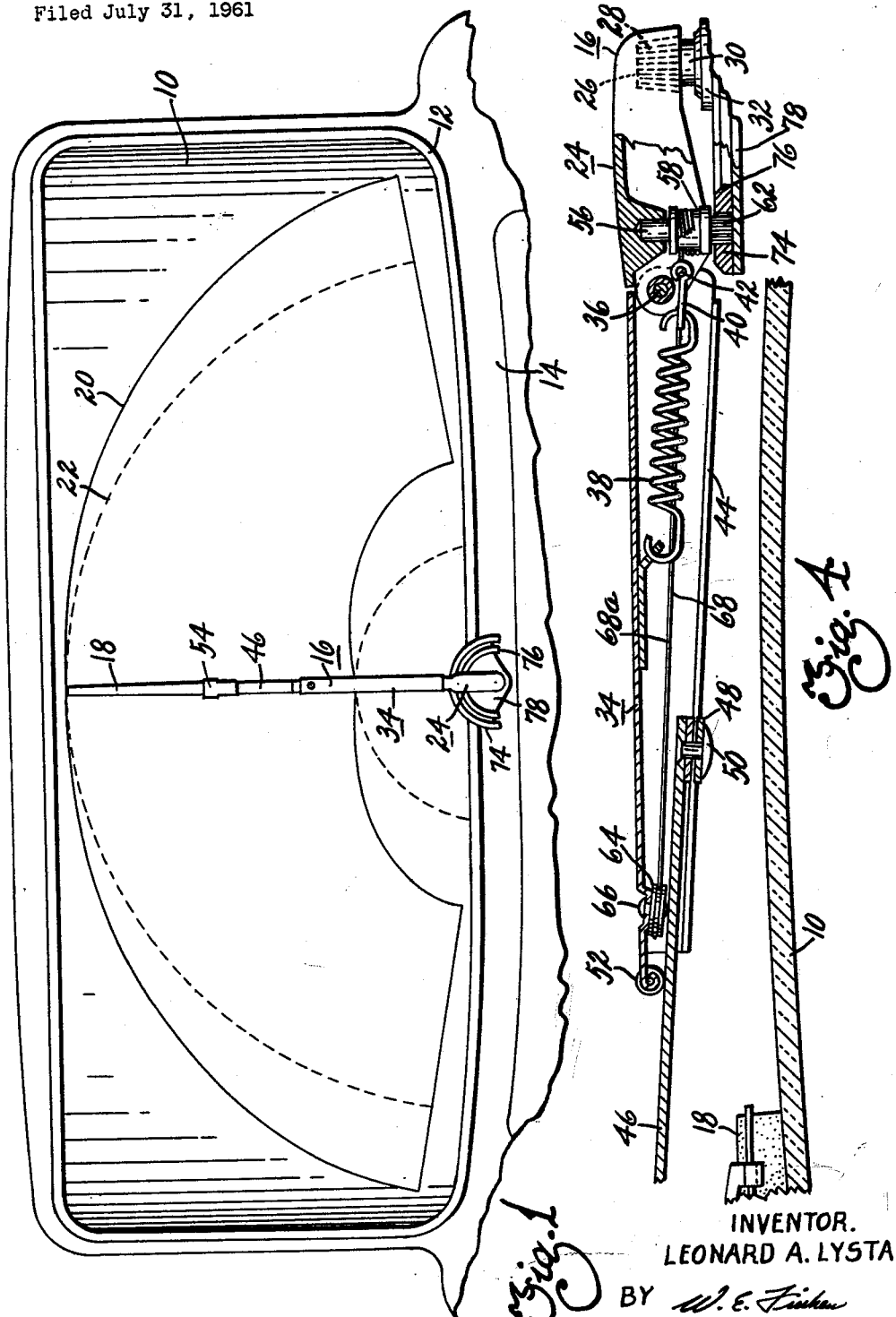

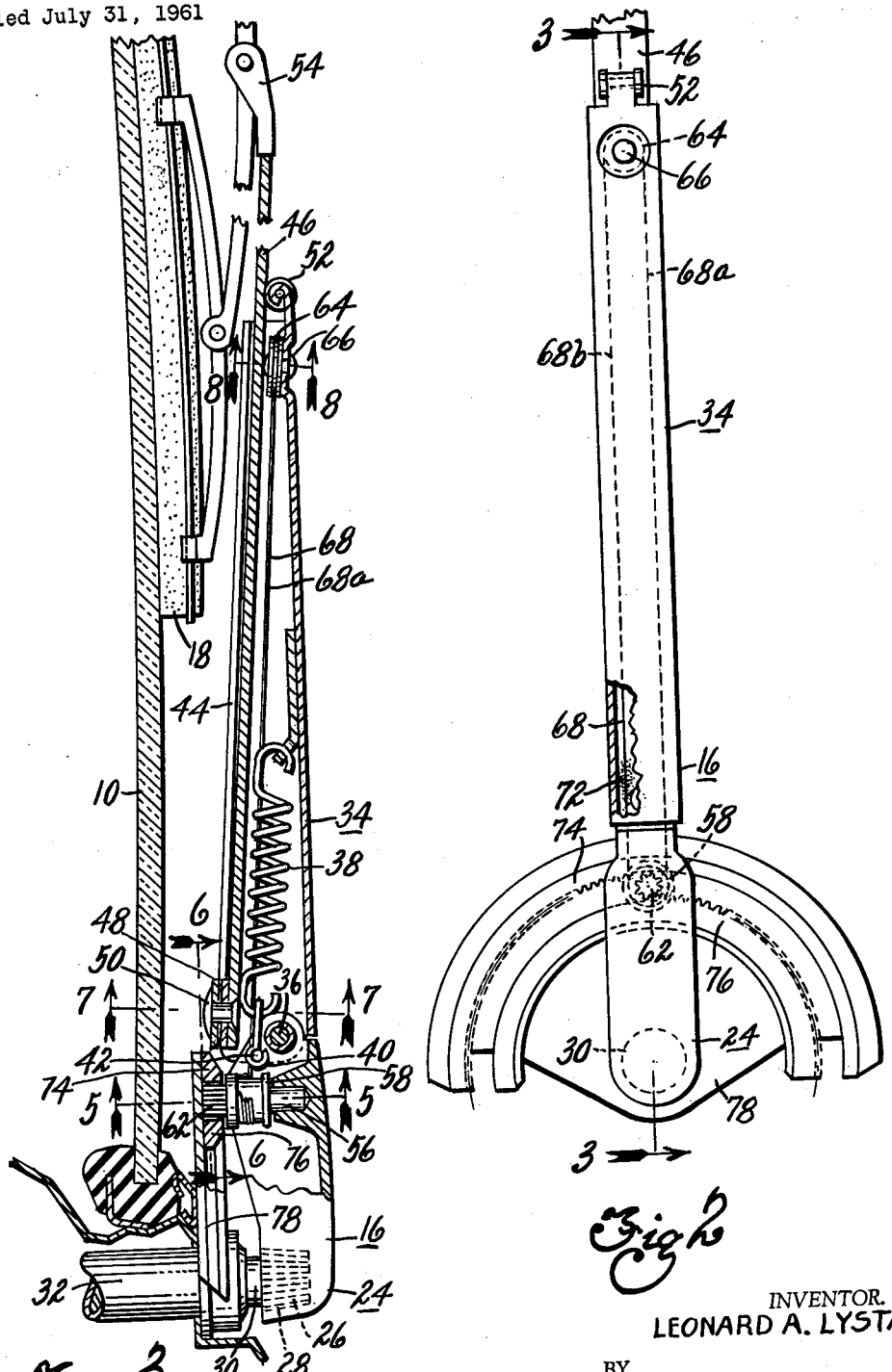

INVENTOR.
LEONARD A. LYSTAD
BY
*W. E. Fischer*
HIS ATTORNEY 3,077,628
WINDOW CLEANING MECHANISM
Leonard A. Lystad, Detroit, Mich., assignor to General Motors Corporation, Detroit, Mich., a corporation of Delaware
Filed July 31, 1961, Ser. No. 128,232
10 Claims. (Cl. 15—250.23)

This invention pertains to window cleaning mechanisms, and particularly to an extensible wiper arm for use in cleaning the rear window of a vehicle.

In order to assure adequate rear vision in a vehicle during inclement weather conditions, it is desirable to provide wiper mechanism for the rear vehicle window. However, conventional wiper mechanism as used on a windshield comprising a fixed length arm and blade assembly is incapable of cleaning an adequate area of rear vehicle windows since the path traversed by a single wiper blade does not extend to the side edge portions of the window. The present invention relates to an extensible wiper arm in combination with means for automatically adjusting the length of the arm during its oscillatory movement so as to increase the radius of the path of movement as the arm moves from a vertical position to a horizontal position in either direction. In this manner, a greater portion of the rear window will be cleaned, and the path of the wiper blade carried by the wiper arm will be extended adjacent the side edges of the window.

Accordingly, among my objects are the provision of an improved wiper mechanism for cleaning the rear window of a vehicle; the further provision of a longitudinally extensible wiper arm comprising a pair of relatively movable sections and means operable to automatically vary the length of the wiper arm during oscillation thereof; and the still further provision of an extensible wiper arm and control means therefor which are automatically operable to extend the wiper arm as it moves towards the horizontal position and retract the wiper arm as it moves toward a vertical position.

The aforementioned and other objects are accomplished in the present invention by interconnecting the relatively movable arm sections by endless cable means and providing a gear drive for automatically controlling the extension and retraction of the wiper arm during its oscillatory movement. Specifically, the improved wiper arm comprises a head, or socket section, adapted for driving connection to a pivot shaft; an intermediate arm section spring hinge connected to the socket section; and an outer, or blade carrying, section slidably supported by the intermediate section. An idler pulley is rotatably supported adjacent the outer end of the intermediate section. A cable drum is rotatably supported by the socket section and an endless cable having a plurality of turns around the drum extends from the drum around the idler pulley on the intermediate section and is attached to the blade carrying section adjacent the inner end thereof. The cable is also attached to the drum at one point.

The drum has a pinion connected thereto which is engageable with a pair of stationary sector gears which partially circumscribe the pivot shaft and are coaxial therewith. The sector gears are radially spaced and subtend adjacent quadrants so that the pinion only engages the teeth of one of the sector gears at any one time. Moreover, the sector gears will effect rotation of the pinion in opposite directions during movement of the wiper arm in one direction since one sector gear is internally toothed and the other is externally toothed.

The arrangement of the several parts of the assembly is such that the wiper arm is retracted when it is in a substantially vertical, or midstroke, position whereat the pinion is disengaged from both sector gears. When the wiper arm is oscillated in either direction from the vertical position, one side of the cable is wound on the drum while the other side is unwound therefrom so as to extend the blade carrying section of the wiper arm to a maximum radius when the wiper arm approaches the substantially horizontal stroke end position. As the wiper arm moves from a substantially horizontal position to the vertical position, the other side of the cable is wound on the drum thereby progressively retracting the blade carrying section of the wiper arm so that it has a minimum radius in a substantially vertical position.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 1 is a fragmentary view of a vehicle having the improved rear window cleaning mechanism of the present invention.

FIGURE 2 is a fragmentary view with certain parts broken away, partly in section and partly in elevation, depicting the extensible wiper arm and control mechanism.

FIGURE 3 is a fragmentary view, partly in section and partly in elevation, taken along line 3—3 of FIGURE 2 showing the wiper arm fully retracted.

FIGURE 4 is a view similar to FIGURE 3 showing the wiper arm fully extended.

Figure 5:
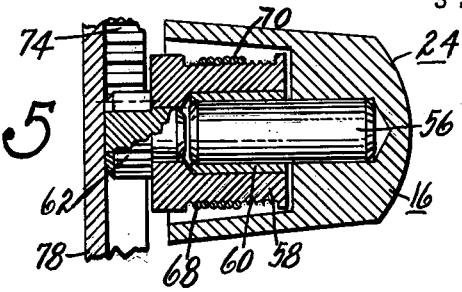
Figure 6:
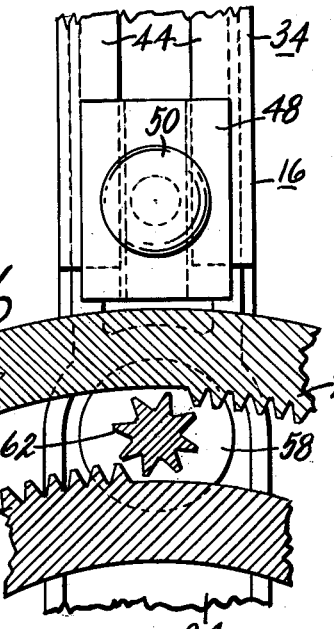
Figure 7:
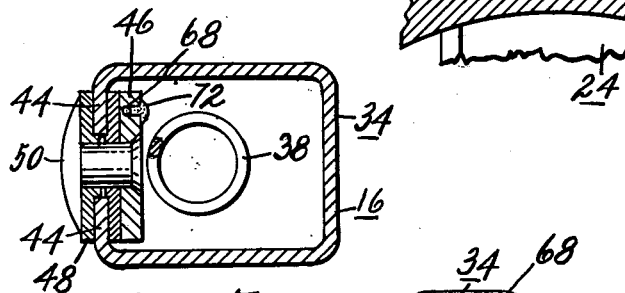
Figure 8:
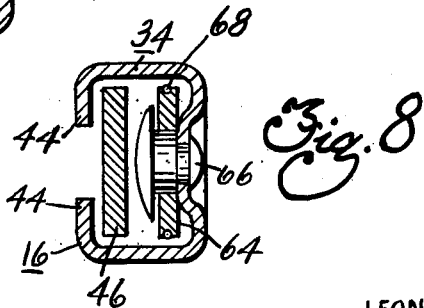

FIGURES 5, 6, 7 and 8 are sectional views, taken along lines 5—5, 6—6, 7—7 and 8—8, respectively, of FIGURE 3.

With particular reference to FIGURE 1, the rear portion of a vehicle is shown including a rear window 10 surrounded by a reveal molding 12 above the rear deck 14. A wiper arm 16 carrying a blade 18 is centrally mounted on the rear deck 14 adjacent the lower edge of the window for oscillation across the outer surface of the rear window 10. The path traversed by the wiper blade 18 is depicted by the solid lines 20 from which it can be seen that the radius of the arm is progressively increased as the wiper arm and blade assembly moves from the vertical position to a substantially horizontal position in either direction. By virtue of this arrangement a substantially greater area of the windshield will be cleaned by the wiper blade 18 than with a conventional fixed length wiper arm which would operate to move the wiper blade throughout a path indicated by dotted lines 22.

With reference to FIGURES 2 and 3, the wiper arm 16 comprises a head, or socket, section 24 having a conventional serrated recess 26 adapted for driving engagement with a serrated burr 28 attached to an oscillatable pivot shaft 30 bearing supported in a stationary housing 32 which is mounted in the deck portion 14 of the vehicle adjacent the lower edge of the rear window 10. The pivot shaft 30 may be oscillated by any suitable motor, not shown, throughout a stroke of slightly less than 180° as shown in FIGURE 1. An intermediate channel-shaped arm section 34 is connected to the socket section 24 by a transversely extending hinge pin 36 whereby the intermediate section 34 is free to pivot relative to the socket section 24 under the influence of a spring 38, one end of which is attached to the intermediate arm section 34 and the other end of which is attached to a retainer 40 pivotally mounted on a transverse pin 42 in the socket section 24. The spring 38 applies pressure to the intermediate arm section 34 so as to maintain the wiper blade 18 in firm engagement with the window 10. As seen particularly in FIGURES 7 and 8, the channel-shaped intermediate arm section 34 is formed with inwardly flanged edges 44 throughout its length. An outer, or blade carrying, arm section 46 is telescopically disposed within the side walls of the channelled intermediate section 34 and is adapted for longitudinal movement relative to the intermediate section 34. In order to guide the movement of the outer section 46, a two-part guide 48 is attached to the inner end of the section 46 by a rivet 50, the two parts of the guide straddling the flanged edges 44 of the intermediate arm section 34. A roller 52 is supported adjacent the outer end of the intermediate section 34 and engages the outer surface of the arm section 46 so as to further guide the movement thereof and in addition apply wiping pressure thereto from the spring 38. As seen in FIGURE 3, the outer end of the arm section 46 is suitably attached to the blade by a conventional connector 54.

A stub shaft 56 is press-fitted in a recess in the socket section 24 with the axis of the stub shaft being parallel to the axis of the pivot shaft 30. A cable drum 58 is rotatably supported on the stub shaft 56 by a sleeve bearing 60, and a pinion 62 is press-fitted into and thereafter soldered to the drum 58. Accordingly, the drum 58 and the pinion 62 are connected for rotation in unison. An idler pulley 64 is rotatably mounted on a rivet 66 adjacent the outer end of the intermediate section 34. An endless cable 68 extends between the idler pulley 64 and the drum 58, the cable having six turns on the drum 58 with one turn being soldered thereto at 70. Another portion of the cable 68 is soldered to the outer arm section 46 adjacent the inner end thereof as indicated by 72.

Accordingly, it will be apparent that as the pinion 62 and the drum 58 are rotated in the clockwise direction as viewed in FIGURE 2, side 68a of the cable will be wound on the drum while side 68b will be unwound therefrom and in so doing the outer arm section 46 will slide longitudinally outward so as to increase the length of the wiper arm. Conversely, when the wiper arm is extended as shown in FIGURE 4, counterclockwise rotation of the pinion 62 and the drum 58 as seen in FIGURE 2 will result in side 68b of the cable being wound on the drum while side 68a is unwound therefrom so as to retract the outer arm section 46 and thus decrease the length of the wiper arm.

In order to achieve automatic progressive variation in the length of the wiper arm and thus vary the radius of the path of movement of the wiper blade 18 as it moves throughout its stroke across the outer surface of the rear window, a pair of stationary sector gears 74 and 76 are formed on a bracket 78 attached to the housing 32 supporting the pivot shaft 30. The sector gears 74 and 76 are radially spaced as shown in FIGURE 2 and are coaxial with the pivot shaft 30. Moreover, the sector gear 74 constitutes an internally toothed gear which subtends an angle of slightly less than 90° whereas the sector gear 76 constitutes an externally toothed gear which likewise subtends an angle of slightly less than 90°, the two gear sectors being disposed in adjacent quadrants so that the pinion gear 62 can only engage one of the sector gears at any one time. Moreover, when the wiper arm 16 and the pivot shaft 30 are in their midstroke, or vertical, position as depicted in FIGURES 1 through 3 and 6, the pinion 62 is disengaged from both sector gears 74 and 76.

With the wiper arm in the vertical position of FIGURE 2, upon oscillation of the arm in the clockwise direction as viewed in FIGURE 2, the pinion 62 will engage the sector gear 76 and thereby impart clockwise movement to the pinion 62 as seen in FIGURE 2. Accordingly, as the wiper arm 16 moves to its right hand substantially horizontal stroke end position as viewed in FIGURE 1, the side 68a of the cable will be wound on the drum 58 while the side 68b is unwound therefrom thereby progressively increasing the length of the wiper arm so as to increase the radius of the wiper path. FIGURE 4 depicts the relationship of the several parts with the outer section of the wiper arm 46 fully extended.

As the wiper arm moves from the right hand substantially horizontal stroke end position of FIGURE 1 back to the vertical position as shown in full lines in FIGURE 1, the pinion 62 meshing with the sector gear 76 will be rotated in the counterclockwise direction thereby winding side 68b on the drum 58 and unwinding side 68a so that the wiper arm will be fully retracted when it arrives at its vertical position. During continued counterclockwise movement of the wiper arm 16, the pinion 62 will engage the sector gear 74 which, being an internally toothed gear, will impart clockwise rotation to the pinion 62 to again extend the wiper arm so that it is fully extended adjacent its substantially horizontal left hand stroke end position. As the wiper arm 16 returns to its vertical position in the clockwise direction from its left hand end stroke position, the pinion 68 will again be rotated in the counterclockwise direction so as to retract the wiper arm 16.

From the foregoing it is apparent that the present invention enables a substantially greater portion of a window to be cleaned by a single oscillatable wiper blade and arm assembly in that the radius of the path of the wiper blade is progressively increased as the wiper arm and blade assembly moves from the vertical position towards horizontal positions. Moreover, the mechanism is automatic in its operation and requires only a slight modification of existing wiper mechanisms to achieves the desirable results.

While the embodiment of the invention as herein disclosed constitutes a preferred form, it is to be understood that other forms might be adopted.

What is claimed is as follows:

1. Vehicle window cleaning mechanism including, a window, an oscillatable pivot shaft disposed substantially centrally of said window along an edge thereof, a longitudinally adjustable wiper arm drivingly connected to said shaft and oscillatable throughout a stroke having a substantially vertical midstroke position and stroke end positions on opposite sides of said vertical position, said wiper arm comprising a socket section drivingly connected to said shaft, an intermediate section spring hinged to said socket section and an outer section slidably mounted on said intermediate section, a wiper blade carried by said wiper arm for movement across the surface of said window, endless cable means interconnecting said socket section and said outer arm section, and automatically operable means for actuating said endless cable means during oscillation of said wiper arm to extend and retract said outer arm section whereby the wiper arm will be fully extended at its stroke end positions and fully retracted at its midstroke position.

2. Vehicle window cleaning mechanism including, a stationary housing, an oscillatable pivot shaft journalled in said housing, a longitudinally adjustable wiper arm drivingly connected to said pivot shaft and oscillatable throughout a stroke having a substantially vertical midstroke position and the stroke end positions on opposite sides thereof, said wiper arm comprising a socket section drivingly connected to said shaft, an intermediate section spring hinged to said socket section and an outer section slidably mounted in said intermediate section, a wiper blade carried by said outer arm section for movement across the surface of a window, endless cable means interconnecting said outer arm section and said socket section, and gear means carried by said socket section and reacting against said stationary housing for actuating said endless cable means to extend and retract said wiper arm during oscillation thereof whereby the wiper arm will be fully extended adjacent its stroke end positions and fully retracted at its midstroke position.

3. The window cleaning mechanism set forth in claim 2 wherein said endless cable means includes a drum rotatably supported on said inner socket section, an idler pulley rotatably supported by said intermediate section and an endless cable having a plurality of turns around said drum, said cable extending around said idler pulley and being attached to said drum and to said outer arm section whereby rotation of said drum in one direction extends the outer arm section and rotation of said drum in the opposite direction retracts said outer arm section.

4. The window cleaning system set forth in claim 3 wherein said gear means comprises a pinion attached to said drum, and wherein said stationary housing includes a pair of sector gears disposed in adjacent quadrants and selectively engageable with said pinion, one of the sector gears being internally toothed and the other of said sector gears being externally toothed.

5. A wiper arm including, a socket section carrying a rotatable drum, an intermediate section carrying a rotatable idler pulley and spring hinged to said socket section, an outer section mounted for longitudinal movement relative to said intermediate section, and an endless cable wrapped around and attached to said drum, extending around said idler pulley and connected to said outer section for imparting longitudinal movement thereto.

6. A wiper arm including, a socket section adapted for connection to a pivot shaft, an intermediate section spring hinged to said socket section, an outer section slidably mounted on said intermediate section for longitudinal movement relative thereto, and endless cable means connecting said outer section and said socket section for imparting longitudinal movement to said outer section comprising a drum rotatably supported on said socket section, an idler pulley rotatably supported on said intermediate section adjacent the outer end thereof, and an endless cable having a plurality of turns around said drum and attached thereto, extending around said idler pulley and connected to the outer arm section adjacent the inner end thereof.

7. A wiper arm including, a socket section carrying a rotatable drum, an intermediate section of channel-shape spring hinged to said socket section and having inwardly flanged side walls, an idler pulley rotatably supported on said intermediate section adjacent the outer end thereof, an outer section disposed within said intermediate section and slidably engaging the inwardly flanged side wall edges thereof, and an endless cable wrapped around and attached to said drum, extending around said idler pulley and connected to said outer section for imparting longitudinal movement to said outer section.

8. The wiper arm set forth in claim 7 wherein said intermediate arm section carries a roller engageable with said outer arm section for guiding its movement and applying wiping pressure thereto.

9. A vehicle window cleaning mechanism including, a stationary housing, an oscillatable pivot shaft journalled in said housing, a longitudinally adjustable wiper arm drivingly connected to said pivot shaft and oscillatable throughout a stroke having a substantially vertical midstroke position and stroke end positions on opposite sides thereof, said wiper arm comprising a socket section drivingly connected to said shaft, an intermediate section spring hinged to said socket section and an outer section slidably mounted on said intermediate section, a wiper blade carried by said outer section for movement across the surface of a window, endless cable means interconnecting said outer arm section and said socket section, and reversely rotatable means carried by said socket section and reacting against said stationary housing for reversely actuating said endless cable means to progressively extend said wiper arm during oscillation thereof in either direction from its midstroke position and progressively retract said wiper arm during oscillation thereof towards its midstroke position.

10. The window cleaning system set forth in claim 9 wherein said reversely rotatable means comprises a gear, and wherein said stationary housing includes a pair of sector gears disposed in adjacent quadrants, one of said sector gears being internally toothed and the other of said sector gears being externally toothed, said gear being selectively engageable with one or the other of said sector gears in accordance with the direction of oscillation of said wiper arm from its midstroke position.

References Cited in the file of this patent

UNITED STATES PATENTS 2,979,425     Krohm ---------------- Apr. 11, 1961

FOREIGN PATENTS 795,541     France ---------------- Jan. 8, 1936